United States Patent
Bauerle et al.

(10) Patent No.: US 7,126,463 B2
(45) Date of Patent: Oct. 24, 2006

(54) PWM AND VARIABLE FREQUENCY BASED POSITION INDICATORS

(75) Inventors: Paul A. Bauerle, Fenton, MI (US); Kerfegar K. Katrak, Fenton, MI (US); John N. Stockbridge, Novi, MI (US)

(73) Assignee: General Motors Corporation, Detroit, MI (US)

( * ) Notice: Subject to any disclaimer, the term of this patent is extended or adjusted under 35 U.S.C. 154(b) by 78 days.

(21) Appl. No.: 10/895,641

(22) Filed: Jul. 21, 2004

(65) Prior Publication Data

US 2005/0035870 A1    Feb. 17, 2005

Related U.S. Application Data

(60) Provisional application No. 60/491,905, filed on Aug. 1, 2003, provisional application No. 60/491,903, filed on Aug. 1, 2003, provisional application No. 60/491,700, filed on Aug. 1, 2003.

(51) Int. Cl.
  *B60Q 1/00*    (2006.01)
(52) U.S. Cl. .................. 340/453; 340/439; 340/686.1; 340/870.16; 701/114; 701/115
(58) Field of Classification Search ................ 340/453, 340/439, 531, 686.1, 870.16; 701/1, 51, 701/55, 114, 115; 364/424.08, 424.1, 431.07, 364/900
See application file for complete search history.

(56) References Cited

U.S. PATENT DOCUMENTS 5,280,238 A    1/1994    Tsuchiya et al. ............ 324/207
5,526,261 A  * 6/1996    Kallis et al. ................... 701/51
5,778,329 A  * 7/1998    Officer et al. ................. 701/55

FOREIGN PATENT DOCUMENTS

| DE | 3631509 C1 | 3/1987 |
|----|-----------|--------|
| DE | 1973799 A1 | 3/1999 |
| EP | 0871011 A2 | 4/1998 |

* cited by examiner

*Primary Examiner*—Hung Nguyen
(74) *Attorney, Agent, or Firm*—Christopher DeVries

(57) ABSTRACT

A control system includes a device having a position between minimum and maximum positions. A first position sensor senses the position of the device and generates a first position value. A second position sensor senses the position of the device and generates a second position value. A sensor module communicates with the first and second position sensors and generates a single signal waveform based on the first and second position values. A frequency of the waveform is varied based on the first position value. A duty cycle of the waveform is varied based on the second position value. A conductor has a first end that communicates with the sensor module and a second end that communicates with a control module. The sensor module transmits the waveform to the control module on the conductor. The control module decodes the waveform to determine the first and second position values.

20 Claims, 5 Drawing Sheets

PWM AND VARIABLE FREQUENCY BASED POSITION INDICATORS

CROSS-REFERENCE TO RELATED APPLICATIONS

This application claims the benefit of U.S. Provisional Application Nos. 60/491,903, filed on Aug. 1, 2003, 60/491,700, filed on Aug. 1, 2003, and 60/491,905, filed on Aug. 1, 2003, which are hereby incorporated by reference in their entirety.

FIELD OF THE INVENTION

The present invention relates to vehicle control systems, and more particularly to redundant position sensing of entities in vehicle control systems.

BACKGROUND OF THE INVENTION

Vehicle manufacturers are increasingly replacing mechanical linkages in vehicles with sensors and electromechanical devices to reduce weight and cost. For example, sensors are replacing mechanical linkages to detect positions of user operated devices such as accelerator, clutch, and brake pedals. Signals are transmitted from the sensors to controllers and/or electromechanical devices in the vehicle. For example, a signal from an accelerator pedal may be transmitted to an actuator in the electronic throttle body to adjust the position of the throttle plate 26. Additionally, a throttle position sensor detects the position of the throttle plate 26 and transmits a signal to an engine control module.

In cases where mechanical linkages are at least partially eliminated, multiple sensors are commonly used to perform redundant measurements and ensure system accuracy. For example, some manufacturers use analog position sensors that are based on a resistive ink or paste that is deposited on a non-conducting substrate. Other manufacturers use application specific integrated circuits (ASICs) in combination with sensors. The sensors typically include hall effect or inductively coupled sensors. The ASICs receive analog signals from the sensors and output pulse width modulated (PWM) or other types of signals. Any of these sensors may use one or multiple shared reference voltages. However, as the number of sensors increases, the number of wires and overall cost increases.

SUMMARY OF THE INVENTION

A control system according to the present invention includes a device having a position between minimum and maximum positions. A first position sensor senses the position of the device and generates a first position value. A second position sensor senses the position of the device and generates a second position value. A sensor module communicates with the first and second position sensors and generates a single signal waveform based on the first and second position values. A frequency of the waveform is varied based on the first position value. A duty cycle of the waveform is varied based on the second position value. A conductor has a first end that communicates with the sensor module and a second end that communicates with a control module. The sensor module transmits the waveform to the control module on the conductor. The control module decodes the waveform to determine the first and second position values.

In other features, the frequency and the duty cycle increase as the device moves from the minimum position to the maximum position. Alternatively, the frequency increases and the duty cycle decreases as the device moves from the minimum position to the maximum position. Alternatively, the frequency increases and the duty cycle remains constant as the device moves from the minimum position to the maximum position. The waveform is a square waveform. The control module detects voltage bias conditions in the waveform.

In still other features of the invention, a first resolution of the first position sensor is greater than a second resolution of the second position sensor. The control module multiplies the first and/or second position values by a weighting factor to compare the first and second position values. The control module compares the first and second position values and activates an alarm indicator when a difference between the first and second position values is greater than a predetermined value. The device is one of an accelerator pedal, a brake pedal, a clutch pedal, or a throttle blade of a vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
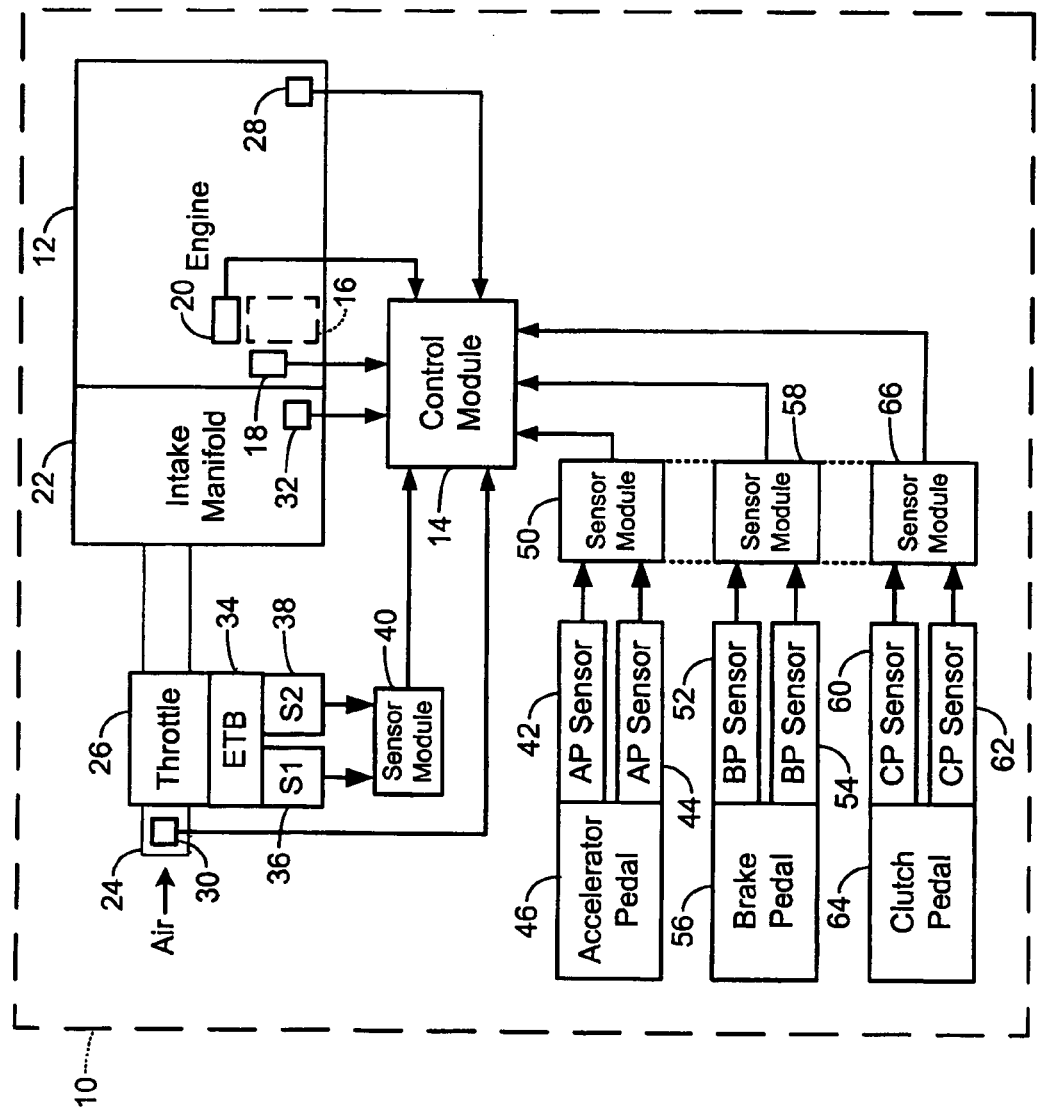
FIG. 1 is a functional block diagram of an engine control system for a vehicle including a control module that receives signals from vehicle sensors according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, a micro-controller with timer I/O, or other suitable components that provide the described functionality.

Referring to FIG. 1, a vehicle 10 includes an engine 12 and a control module 14. The engine 12 includes a cylinder 16 that has a fuel injector 18 and a spark plug 20. Although a single cylinder 16 is shown, those skilled in the art can appreciate that the engine 12 typically includes multiple cylinders 16 with associated fuel injectors 18 and spark plugs 20. For example, the engine 12 may include 4, 5, 6, 8, 10, 12, or 16 cylinders 16.

Air is drawn into an intake manifold 22 of the engine 12 through an inlet 24. A throttle plate 26 regulates air flow through the inlet 24. Fuel and air are combined in the cylinder 16 and are ignited by the spark plug 20. The throttle plate 26 controls the rate that air flows into the intake manifold 22. The control module 14 adjusts the rate that fuel is injected into the cylinder 16 based on the air that is flowing into the cylinder 16 to control the air/fuel (A/F) ratio within the cylinder 16. The control module 14 communicates with an engine speed sensor 28 that generates an engine speed signal. The control module 14 also communicates with mass air flow (MAF) and manifold absolute pressure (MAP) sensors 30 and 32, which generate MAF and MAP signals, respectively.

The engine 12 includes an electronic throttle body (ETB) 34 that is associated with the throttle plate 26. The ETB 34 is controlled by the control module 14 and/or a dedicated controller such as an electronic throttle controller (ETC). First and second throttle position sensors 36 and 38, respectively, detect a position of the throttle plate 26 in the ETB 34 and generate first and second position signals that represent the position of the throttle plate 26. The first and second position signals are received by a sensor module 40. For example, the sensor module 40 may be an application specific integrated circuit (ASIC). The sensor module 40 transmits a signal to the control module 14 that is pulse width modulated (PWM) and that has a variable frequency as will be described in further detail below.

The vehicle 10 optionally includes first and second accelerator pedal (AP) position sensors 42 and 44, respectively, that detect a position of the AP 46. The first and second AP position sensors, 42 and 44, respectively, generate first and second position signals that represent the position of the AP 46. A sensor module 50 receives the first and second position signals and transmits a PWM signal to the control module 14 that also has a variable frequency.

The vehicle 10 optionally includes first and second brake pedal (BP) position sensors 52 and 54, respectively, that detect a position of the BP 56. The first and second BP position sensors 52 and 54, respectively, generate first and second position signals that represent the position of the BP 56. A sensor module 58 receives the first and second position signals and transmits a PWM signal to the control module 14 that also has a variable frequency.

In the case of a manual transmission, the vehicle 10 optionally includes first and second clutch pedal (CP) position sensors 60 and 62, respectively, that detect a position of the CP 64. The first and second CP position sensors 60 and 62, respectively, generate first and second position signals that represent the position of the CP 64. A sensor module 66 receives the first and second position signals and transmits a PWM signal to the control module 14 that also has a variable frequency. Those skilled in the art can appreciate that sensors other than those shown in FIG. 1 may be employed.

The sensor modules 40, 50, 58, and 66 generate respective PWM signals based on respective first and second position signals. The PWM signals include a single signal waveform that indicates values of both the first and second position signals. In an exemplary embodiment, a variable frequency of a PWM signal corresponds to a value of a first position signal, and a variable duty cycle of the PWM signal corresponds to a value of a second position signal. Those skilled in the art can appreciate that any of the sensor modules 40, 50, 58, and/or 66 may receive position signals from more than two position sensors for added redundancy.

It is possible to utilize only the first throttle position sensor 36 and still obtain redundant measurements of the position of the throttle plate 26. For example, other sensors such as the MAF and MAP sensors 30 and 32, respectively, indicate a flow rate and/or a pressure of the air in the intake manifold 22 that may be used to determine a position of the throttle plate 26. In this case, the sensor module 40 generates a signal that includes one of a variable frequency and a variable duty cycle that is based on a value of the first position signal from the first throttle position sensor 36. However, it is difficult to accurately compare the position of the throttle plate 26 from the first throttle position sensor 36 and from the MAF and/or MAP sensors 30 and 32, respectively, in both static and dynamic vehicle conditions.

The present invention proposes to generate a single signal waveform based on two position signals from two similar position sensors. This allows the control module 14 to accurately compare the values of the first and second position signals after the control module 14 decodes the waveform. The control module 14 decodes the waveform by first detecting the frequency and the duty cycle of the waveform. The control module 14 then converts the frequency and duty cycle to position values based on predetermined functions and determines whether a difference between the position values is greater than a predetermined value.

For example, the frequency/duty cycle of the waveform may increase as a position of the throttle plate 26 increases from a minimum position to a maximum position. In the case of the throttle plate 26, the minimum position corresponds to an idle position, and the maximum position corresponds to a wide open throttle (WOT) position. Alternatively, the frequency/duty cycle may decrease as a position of the throttle plate 26 increases from the minimum position to the maximum position.

Figure 2:
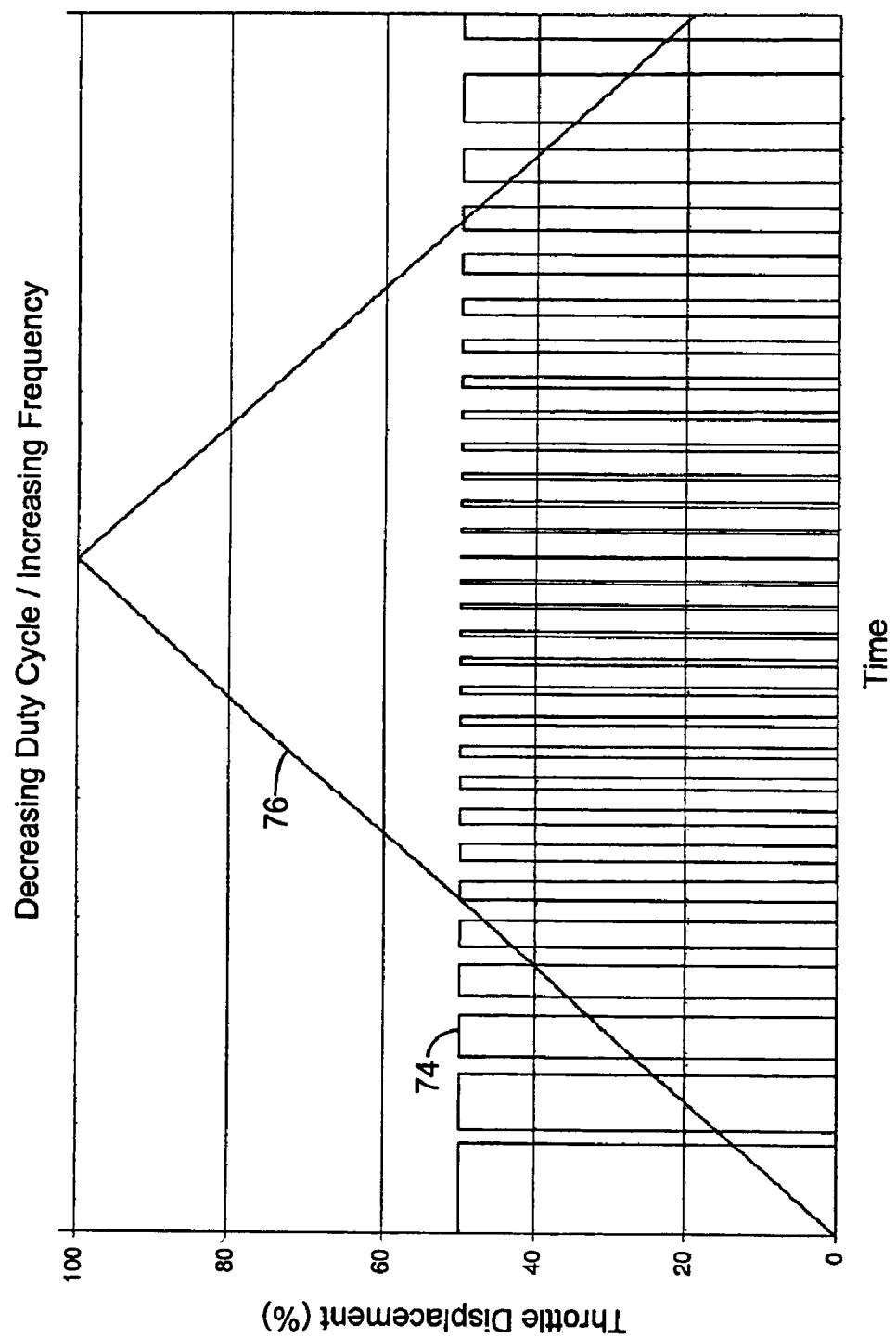
FIG. 2 is a graph showing a waveform that is generated based on dual position indication signals with a decreasing duty cycle and an increasing frequency as a throttle displacement percentage increases.

Referring now to FIG. 2, in an exemplary embodiment, the sensor modules 40, 50, 58, and 66 output square waveforms. However, radiated emissions standards may dictate minimum and maximum rise and fall times. Therefore, the waveforms may not be perfectly square. The waveforms illustrated in FIGS. 2–4 indicate values of first and second positions signals from first and second throttle position sensors 36 and 38, respectively. However, similar waveforms may be employed to indicate positions of other vehicle devices.

In FIG. 2, the duty cycle of the waveform 74 decreases as a position of the throttle plate 26 increases from a minimum position to a maximum position. The position of the throttle plate 26 (indicated by 76) is indicated as a percentage that the throttle plate 26 is between the minimum and maximum positions. For example, 0% refers to the idle position, and 100% refers to the WOT position. Likewise, the duty cycle increases as the position of the throttle plate 26 decreases from the maximum position to the minimum position.

The frequency of the waveform 74 increases as the position of the throttle plate 26 increases from the minimum to the maximum position. Likewise, the frequency decreases as the position of the throttle plate 26 decreases from the maximum to the minimum position. This relationship may also be inverted. For example, the duty cycle and frequency may increase and decrease, respectively, as the position of the throttle plate 26 increases from the minimum to the maximum position.

Figure 3:
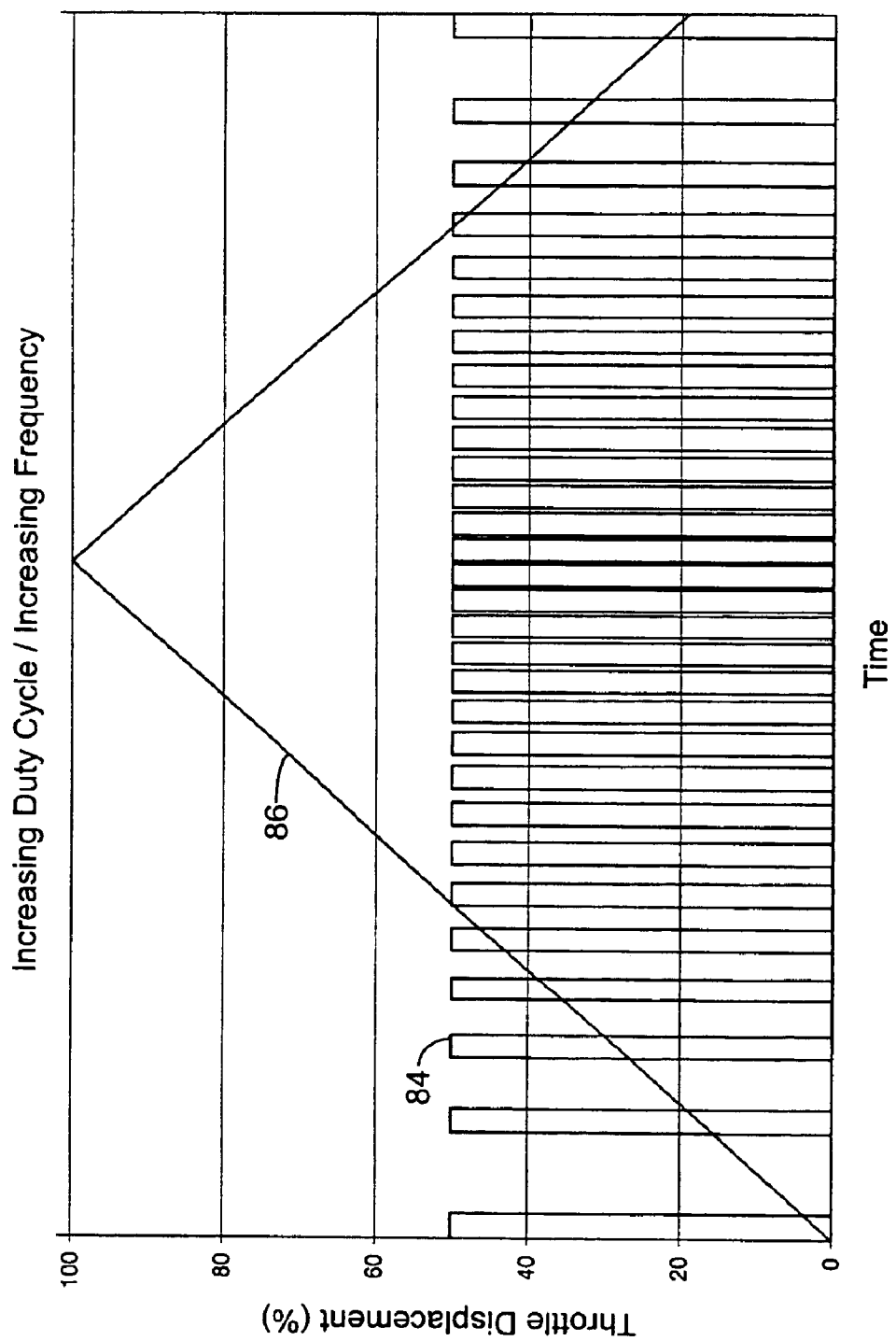
FIG. 3 is a graph showing the waveform with an increasing duty cycle and an increasing frequency as the throttle displacement percentage increases.

Referring now to FIG. 3, the duty cycle of the waveform 84 increases as the position of the throttle plate 26 (indicated by 86) increases from the minimum position to the maximum position. Likewise, the duty cycle decreases as the position of the throttle plate 26 decreases from the maximum position to the minimum position. As in FIG. 2, the frequency of the waveform 84 increases as the position of the throttle plate 26 increases from the minimum to the maximum position. Likewise, the frequency decreases as the position of the throttle plate 26 decreases from the maximum to the minimum position. This relationship may also be inverted. For example, the duty cycle and frequency may both decrease as the position of the throttle plate 26 increases from the minimum to the maximum position.

Figure 4:
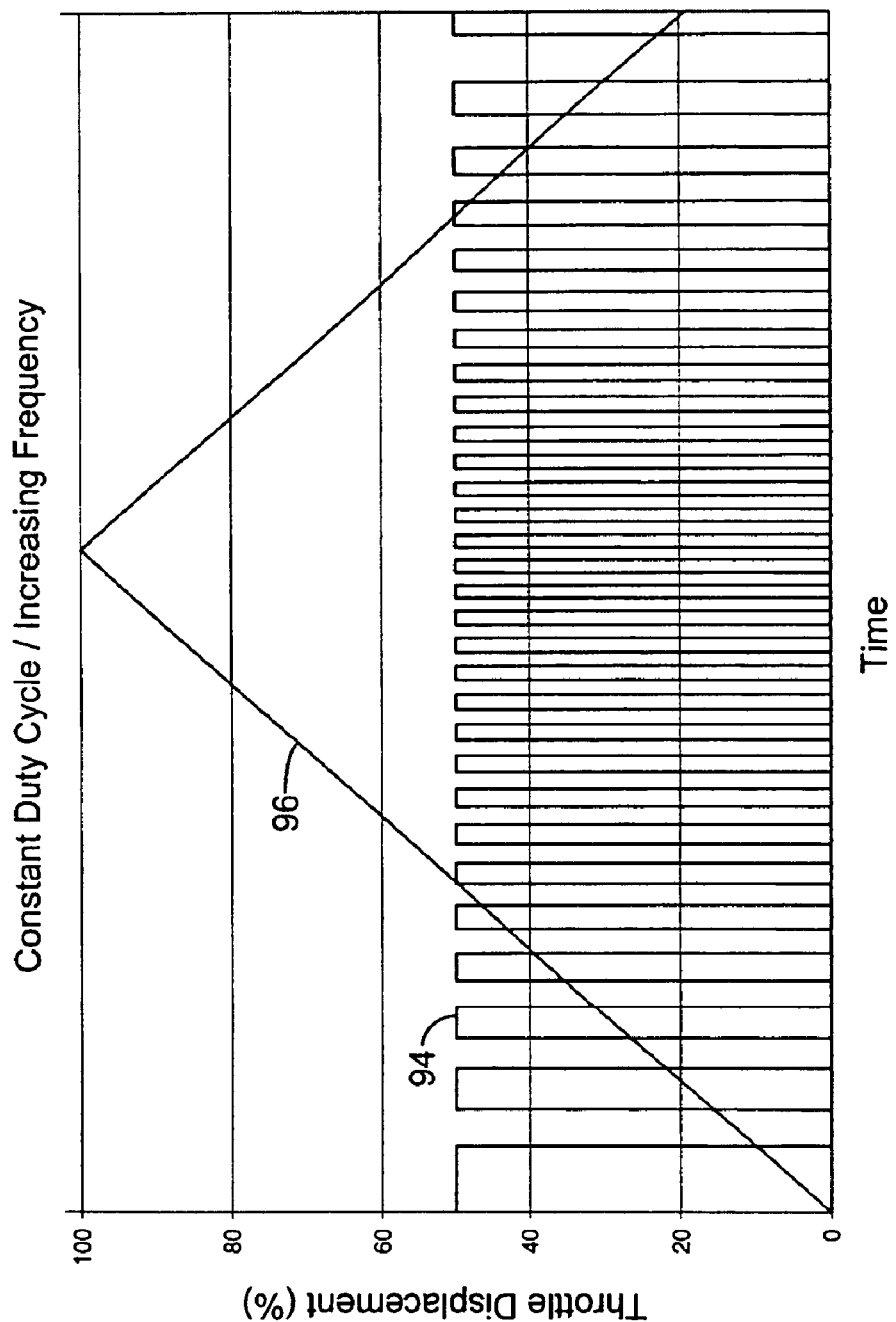
FIG. 4 is a graph showing the waveform with a constant duty cycle and an increasing frequency as the throttle displacement percentage increases.

Referring now to FIG. 4, the duty cycle of the waveform 94 remains constant as the position of the throttle plate 26 (indicated by 96) changes. For example, the first sensor may determine the frequency of the waveform and the second sensor may determine the high time (or low time) so that the duty cycle remains constant at 50% or another value. If, when recovering the first and second position signals from the waveform, the calculated duty cycle is equal to a value other than 50% (or another predetermined percentage), the first and second throttle position sensors 36 and 38, respectively, are flagged as failed (step 120 in FIG. 5). Alternatively, the sensor module 40 may adjust only one of the frequency and the duty cycle when a single throttle position sensor 36 is employed. As in FIGS. 2 and 3, the frequency of the waveform 94 increases as the position of the throttle plate 26 increases from the minimum to the maximum position. Likewise, the frequency decreases as the position of the throttle plate 26 decreases from the maximum to the minimum position.

This relationship may also be inverted. For example, the frequency may decrease as the position of the throttle plate 26 increases from the minimum to the maximum position while the duty cycle remains constant. For example, the duty cycle may be fixed at 50%. Those skilled in the art can appreciate that other combinations of waveform characteristics may be used to represent values of the position signals from the throttle position sensors 36 and 38.

In an exemplary embodiment, the control module 14 determines the frequency of a waveform from a first rising edge to a second rising edge. In this case, the control module 14 determines the duty cycle of the waveform by determining the percentage of time that the signal is high between the first and second rising edges. Alternatively, the control module 14 may determine the frequency of the waveform from a first falling edge to a second falling edge. In this case, the control module 14 determines the duty cycle of the waveform by determining the percentage of time that the signal is low between the first and second falling edges.

Figure 5:
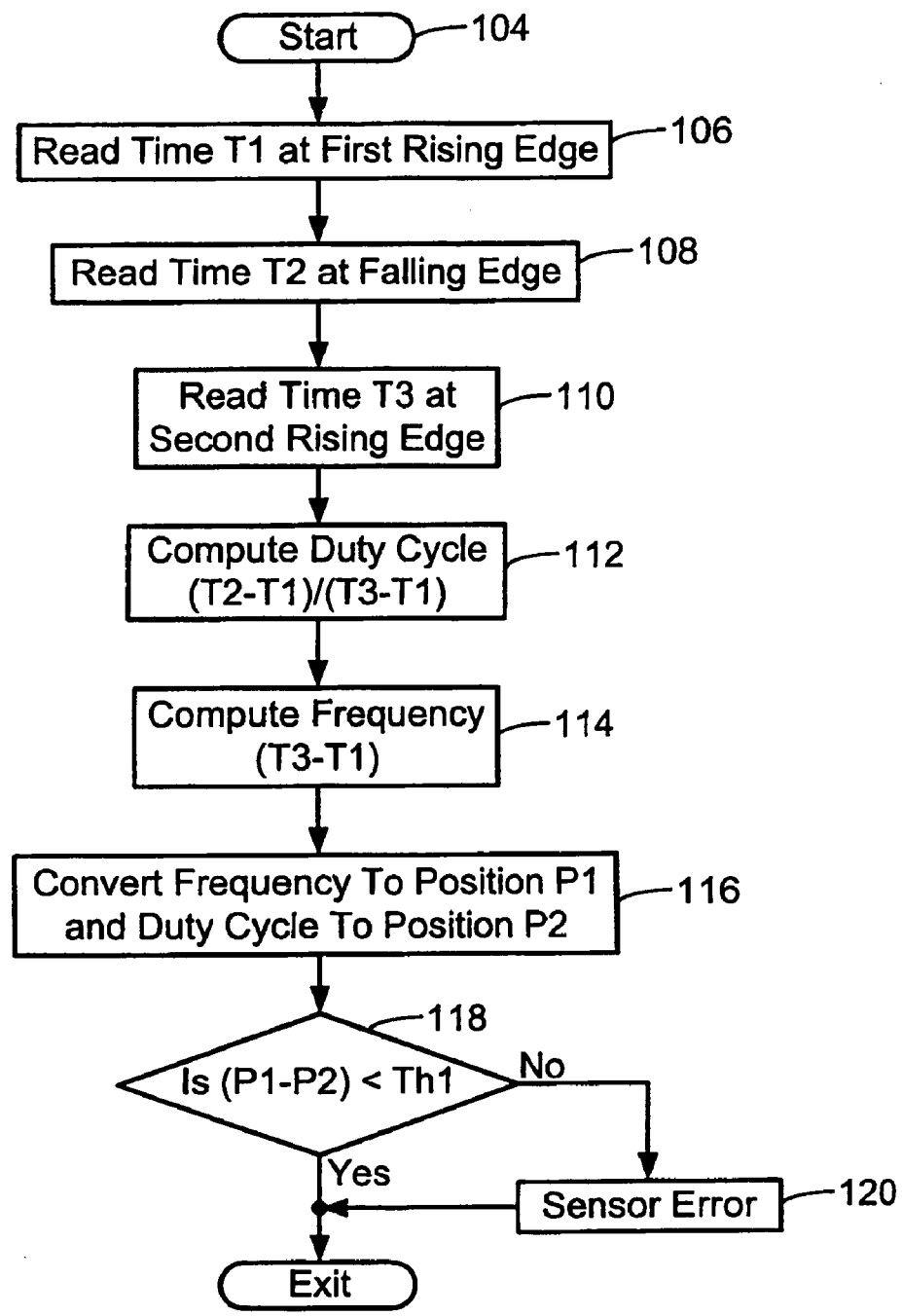
FIG. 5 is flowchart illustrating steps performed by the control module of FIG. 1 to decode a waveform that is based on dual position indication signals.

Referring now to FIG. 5, a measurement redundancy algorithm that is executed by the control module 14 begins in step 104. In step 106, control reads time T1 at a first rising edge of the waveform. In step 108, control reads time T2 at the next falling edge of the waveform. In step 110, control reads time T3 at the next rising edge of the waveform. In step 112, control computes the duty cycle of the waveform by dividing the difference between T2 and T1 by the difference between T3 and T1. In step 114, control computes the frequency of the waveform by subtracting T1 from T3.

In step 116, control converts the frequency to position P1 based on a first function and the duty cycle to position P2 based on a second function. Alternatively, control may convert the frequency to position P1 and the high time (or low time) to position P2 in step 116. In step 118, control determines whether the difference between P1 and P2 is less than a predetermined value. If true, control ends. If false, control proceeds to step 120. In step 120, control activates a sensor error indicator and control ends. In step 120, control module 14 may also take corrective action such as implementing a weighting factor for one of the throttle position values so that the system remains operational.

The control module 14 preferably detects voltage bias conditions in the waveforms from the sensor modules 40, 50, 58, and 66. For example, the control module 14 may employ analog voltage bias detection to detect short-to-battery and short-to-ground conditions. The control module 14 may also detect other short conditions to other frequency inputs. For example, a typical square wave signal oscillates between 0.5V and 4.5V when there are no failures. If edge detection is performed between 1.5V and 3.5V, short-to-battery and short-to-ground conditions produce a signal with no frequency. However, short conditions to other frequency inputs may be detected when rising and falling edges of the waveform only switch between 1.0V and 4.0V. This allows the control module 14 to diagnose analog voltage bias due to fretting corrosion of input/output (I/O) pins.

A first resolution of the first throttle position sensor 36 may be greater than a second resolution of the second throttle position sensor 38. In this case, the control module 14 may assign weighting factors to one or both of the throttle position values for an accurate comparison. The control module 14 may convert the frequency and duty cycle of the waveform into throttle position values by using look-up tables, mathematical functions, or other methods. Also, the control module 14 preferably employs standard sensor correlation and out-of-range diagnostics to ensure that recovered throttle position values are within a possible range and that fault conditions do not occur. Additionally, two or more sensor modules may be combined to provide additional inputs and/or outputs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A control system, comprising:
   a device having a position between minimum and maximum positions;
   a first position sensor that senses said position of said device and generates a first position value;
   a second position sensor that senses said position of said device and generates a second position value;
   a sensor module that communicates with said first and second position sensors and that generates a single signal waveform based on said first and second position values, wherein a frequency of said waveform is varied based on said first position value and a duty cycle of said waveform is varied based on said second position value;
   a conductor having a first end that communicates with said sensor module and a second end; and
   a control module that communicates with said second end of said conductor, wherein said sensor module transmits said waveform to said control module on said conductor and said control module decodes said waveform to determine said first and second position values.

2. The control system of claim 1 wherein said frequency and said duty cycle increase as said device moves from said minimum position to said maximum position.

3. The control system of claim 1 wherein said frequency increases and said duty cycle decreases as said device moves from said minimum position to said maximum position.

4. The control system of claim 1 wherein said frequency increases and said duty cycle remains constant as said device moves from said minimum position to said maximum position.

5. The control system of claim 1 wherein said waveform is a square waveform.

6. The control system of claim 1 wherein said control module detects voltage bias conditions in said waveform.

7. The control system of claim 1 wherein a first resolution of said first position sensor is greater than a second resolution of said second position sensor and wherein said control module multiplies said first and/or second position values by a weighting factor to compare said first and second position values.

8. The control system of claim 1 wherein said control module compares said first and second position values and activates an alarm indicator when a difference between said first and second position values is greater than a predetermined value.

9. The control system of claim 1 wherein said device is one of an accelerator pedal, a brake pedal, a clutch pedal, or a throttle blade of a vehicle.

10. A vehicle control system, comprising:
a vehicle device having a position between minimum and maximum positions, wherein said vehicle device is one of an accelerator pedal, a brake pedal, a clutch pedal, or a throttle blade of a vehicle;
a first position sensor that senses said position of said vehicle device and generates a first position value;
a second position sensor that senses said position of said vehicle device and generates a second position value;
a sensor module that communicates with said first and second position sensors and that generates a single signal waveform based on said first and second position values, wherein a frequency of said waveform is varied based on said first position value and a duty cycle of said waveform is varied based on said second position value;
a conductor having a first end that communicates with said sensor module and a second end; and
a control module that communicates with said second end of said conductor, wherein said sensor module transmits said waveform to said control module on said conductor and said control module decodes said waveform to determine said first and second position values.

11. A method for transmitting dual position values on a single signal waveform, comprising:
sensing a position of a device with a first position sensor, wherein said position of said device is between minimum and maximum positions and wherein said first position sensor generates a first position value;
sensing said position of said device with a second position sensor, wherein said second position sensor generates a second position value;
generating a single signal waveform based on said first and second position values;
varying a frequency of said waveform based on said first position value;
varying a duty cycle of said waveform based on said second position value;
transmitting said waveform to a control module on a conductor; and
decoding said waveform at said control module to determine said first and second position values.

12. The method of claim 11 wherein said frequency and said duty cycle increase as said device moves from said minimum position to said maximum position.

13. The method of claim 11 wherein said frequency increases and said duty cycle decreases as said device moves from said minimum position to said maximum position.

14. The method of claim 11 wherein said frequency increases and said duty cycle remains constant as said device moves from said minimum position to said maximum position.

15. The method of claim 11 wherein said waveform is a square waveform.

16. The method of claim 11 further comprising detecting voltage bias conditions in said waveform.

17. The method of claim 11 wherein a first resolution of said first position sensor is greater than a second resolution of said second position sensor.

18. The method of claim 17 further comprising multiplying said first and/or second position values by a weighting factor to compare said first and second position values.

19. The method of claim 11 further comprising:
comparing said first and second position values; and
activating an alarm indicator when a difference between said first and second position values is greater than a predetermined value.

20. The method of claim 11 wherein said device is one of an accelerator pedal, a brake pedal, a clutch pedal, or a throttle blade of a vehicle.

* * * * *